Feb. 20, 1923.
F. C. HUEBER.
ATTACHMENT FOR AUTOMOBILE RADIATORS.
FILED NOV. 1, 1921.
1,446,306.
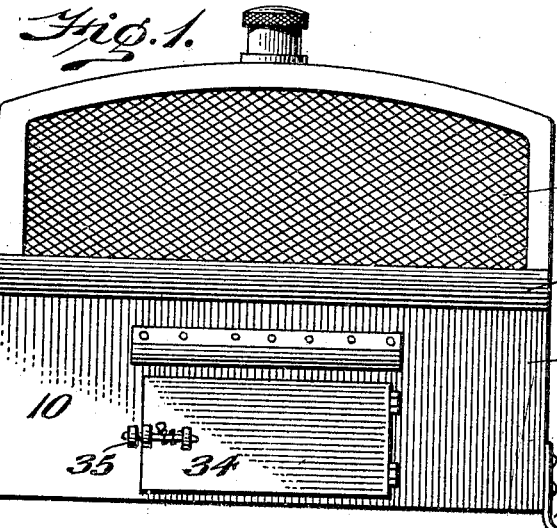
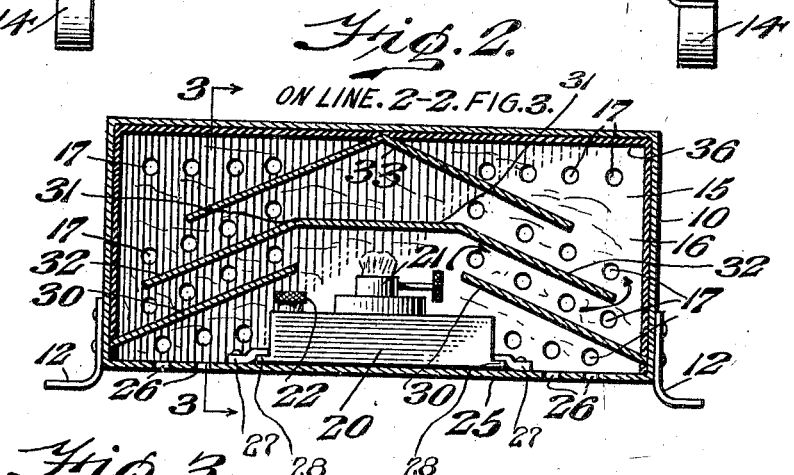
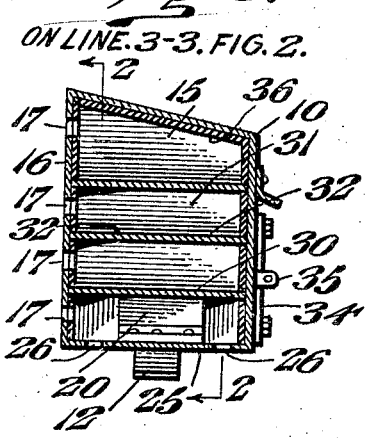
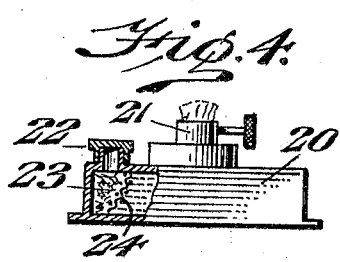
INVENTOR
Frank C. Hueber.
BY
Robert M. Barr
ATTORNEY Patented Feb. 20, 1923.

1,446,306

UNITED STATES PATENT OFFICE.

FRANK C. HUEBER, OF PHILADELPHIA, PENNSYLVANIA.

ATTACHMENT FOR AUTOMOBILE RADIATORS.

Application filed November 1, 1921. Serial No. 511,993.

*To all whom it may concern:*

Be it known that I, FRANK C. HUEBER, a citizen of the United States, and a resident of Philadelphia, county of Philadelphia, State of Pennsylvania, have invented certain new and useful Improvements in Attachments for Automobile Radiators, of which the following is a specification.

Some of the objects of the present invention are to provide an improved means for preventing the cooling fluid of an automobile engine from freezing; to provide a heater for automobile radiators which does not interfere with the proper functioning of such radiator when the automobile is moving; to provide a heater for automobile radiators wherein air to be heated is caused to traverse a maximum distance while being heated in a relatively small heating chamber; to provide a heater arranged to become a permanent part of an automobile radiator in cold or freezing weather, whereby the automobile can be left on the street or outdoors without danger of freezing; and to provide other improvements as will hereinafter appear.

In the accompanying drawings, Fig. 1 represents a front elevation of the radiator of an automobile equipped with a heater embodying one form of the present invention; Fig. 2 represents an elevation of the heater with the front removed to show the interior construction; Fig. 3 represents a section on line 3—3 of Fig. 2; and Fig. 4 represents a detail of the burner construction.

Referring to the drawings, one form of the present invention consists of a casing 10 formed of sheet metal and generally of rectangular shape, the length of which approximates the width of a standard automobile radiator 11. It will be understood that the shape and size of the casing 10 can be made suitable for different sized radiators so that the heat developed will be sufficient to maintain a temperature high enough to prevent the water in the radiator from freezing. The casing 10 is arranged to be rigidly held in place as a permanent winter attachment by plate 12 and bolts 13 secured to the chassis frame 14 or any other suitable part, but is removed in weather which does not warrant its use.

In the preferred form the casing 10 forms a completely enclosed chamber 15, the rear wall 16 of which is provided with outlets or perforations 17, the function of which is to convey the hot-air and products of combustion to the radiator 11. In this connection it will be noted that the height of the perforated wall 16 is substantially less than the height of the radiator to which the casing 10 is attached, so that a sufficient area of radiator surface is exposed for proper running conditions in cold weather.

For the purpose of heating the air circulated within and through the casing 10, a heater is provided preferably in the form of a reservoir 20 for oil having a burner 21 of the wick type. One end of the reservoir 20 is provided with a filling inlet 22 which opens into a waste filled compartment 23 separated by an open work partition 24 from the main oil containing portion of the reservoir 20. This insures a leak-proof construction so that none of the oil can splash or work out of the reservoir 20 when the automobile is in motion. The bottom 25 of the casing 10 is provided with air inlets 26 to promote circulation and combustion, and also has attached thereto spring clips 27. These clips 27 are spaced apart to receive between them the reservoir 20 and are arranged to interengage with laterally disposed flanges 28, whereby the reservoir is rigidly held in place.

For the purpose of utilizing the full heating value of the burner 21 and causing a tortuous circulation of the heated air, the chamber 15 is provided with two inwardly projecting, upwardly inclined baffles 30 rigidly fastened respectively to two opposite side walls of the casing, the juxtaposed ends of said baffles 30 being spaced to permit certain of the products of combustion to pass between them, while other of the products are deflected to pass through the outlets 17 into contact with the lower portion of the radiator 11. Directly above the burner 21, and in the path of the rising heated products, is a transverse plate 31 horizontally disposed and having two downwardly inclined end wings 32, which terminate respectively in close proximity to the side walls of the casing 10. This plate 31 causes the products of combustion to be deflected laterally, in both directions, and downwardly, to rise around the ends of the wings 32, thereby prolonging the path of the air and causing it to be raised to a relatively high temperature. As the plate 31 is directly in the heat zone of the burner 21, it is maintained in a highly heated condition and assists materially in the heating of the air passing through the casing 10.

To further retard the heated air, a deflector 33 with inclined side portions is located adjacent the top of the casing 10 to receive the rising hot products and cause them to again be deflected laterally and downwardly.

Thus by the provision of a series of superposed plates, or baffles, the air is thoroughly heated to the desired temperatures, while the dimensions of the casing 10 are thus kept within limits which do not interfere with the successful operation of the radiator 11.

In order to gain access to the casing 10 to light the burner 21 or to replenish the reservoir 20, the front of the case is apertured and has a hinged door 34 which is provided with a suitable locking latch 35 designed to hold the door 34 tightly closed under all operating conditions.

Preferably the reservoir 20 is filled with a special oil for burning purposes, one which is not explosive or quickly inflammable and which burns slowly with a maximum heating effect.

It is preferable to line the interior of the casing 10 with asbestos 36 or any other suitable heat retaining means whereby loss of heat by radiation through the casing walls is reduced to a minimum.

From the foregoing it will be apparent that a complete unitary heating means for automobile radiators has been provided which can be applied to any type of radiator in such a manner as to permit the radiator to function perfectly as a cooling means when the automobile is running in winter weather, and also to entirely prevent freezing of the cooling fluid when the automobile is stationary.

Further, the air which is caused to pass through the casing 10 is given a tortuous path whereby it receives the full value of the heat units from the burner 21 and is delivered against the lower portion of the radiator 11 hot and effective for the purpose intended.

Having thus described my invention, I claim:

1. A heater for automobile radiators comprising a casing arranged to be secured to a radiator, said casing having a plurality of air inlets in the lower portion thereof and a plurality of outlets arranged to discharge heated air against said radiator, a burner in said casing, an upwardly inclined baffle projecting from each of two opposite side walls of said casing and terminating adjacent said burner, a plate above and bridging the space between said baffles for deflecting products of combustion and hot air laterally, said plate having downwardly inclined wings spaced respectively from the casing walls, and a deflector spaced from and above said plate.

2. A heater for automobile radiators comprising a casing arranged to be secured to a radiator, said casing having a plurality of air inlets in the lower portion thereof and a plurality of outlets arranged to discharge heated air against said radiator, a burner in said casing, an upwardly inclined baffle projecting from each of two opposite side walls of said casing and terminating adjacent said burner, and a plate above and bridging the space between said baffles for deflecting products of combustion and hot air laterally, certain of said discharge outlets being between said baffles and the bottom of said casing, and others of said outlets being between said baffles and said plate.

3. A heater for automobile radiators comprising a casing arranged to be secured to a radiator, said casing having a plurality of air inlets in the lower portion thereof and a plurality of outlets arranged to discharge heated air against said radiator, a burner in said casing, an upwardly inclined baffle projecting from each of two opposite side walls of said casing and terminating adjacent said burner, a plate above and bridging the space between said baffles for deflecting products of combustion and hot air laterally, said plate having downwardly inclined wings spaced respectively from the casing walls, and a deflector spaced from and above said plate, certain of said discharge outlets being between said baffles and the bottom of said casing, others of said outlets being between said baffles and said plate, and still others of said outlets being between said plate and said deflector.

Signed at Philadelphia, in the county of Philadelphia and State of Pennsylvania, this 22nd day of October, 1921.

FRANK C. HUEBER.